US010878217B2

(12) United States Patent
Holz et al.

(10) Patent No.: US 10,878,217 B2
(45) Date of Patent: *Dec. 29, 2020

(54) USER IDENTIFICATION ON A PER TOUCH BASIS ON TOUCH SENSITIVE DEVICES

(71) Applicant: Yahoo Holdings, Inc., Sunnyvale, CA (US)

(72) Inventors: Christian Holz, San Francisco, CA (US); Cheng Xu, San Francisco, CA (US)

(73) Assignee: Verizon Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,738

(22) Filed: Jun. 28, 2016

(65) Prior Publication Data

US 2016/0307024 A1 Oct. 20, 2016

Related U.S. Application Data

(63) Continuation of application No. 14/303,493, filed on Jun. 12, 2014, now Pat. No. 9,396,378.

(51) Int. Cl.

| G06K 9/00 | (2006.01) |
|---|---|
| G06F 3/041 | (2006.01) |
| G06F 21/32 | (2013.01) |
| G06F 3/044 | (2006.01) |

(52) U.S. Cl.
CPC ......... *G06K 9/00087* (2013.01); *G06F 3/044* (2013.01); *G06F 3/0416* (2013.01); *G06F 21/32* (2013.01); *G06K 9/0002* (2013.01); *G06K 9/00013* (2013.01)

(58) Field of Classification Search
CPC ........... G06K 9/00087; G06K 9/00013; G06K 9/0002; G06F 3/0416; G06F 3/044; G06F 21/32
See application file for complete search history.

(56) References Cited

U.S. PATENT DOCUMENTS

| 6,219,793 B1 | 4/2001 | Li et al. | |
|---|---|---|---|
| 2008/0078590 A1* | 4/2008 | Sequine | G06F 3/03548 |
| | | | 178/18.06 |

(Continued)

FOREIGN PATENT DOCUMENTS

| GB | 2306725 A | 5/1997 |
|---|---|---|
| TW | I3122554 B | 7/2009 |
| TW | 201346654 A | 11/2013 |

OTHER PUBLICATIONS

Taiwan Intellectual Property Office, "Office Action" in application on. 105121884, dated Jan. 17, 2017, 8 pages. Taiwan Claims in application No. 105121884, dated Jan. 2017, 3 pages.

(Continued)

*Primary Examiner* — Peter D McLoone
(74) *Attorney, Agent, or Firm* — Pillsbury Winthrop Shaw Pittman LLP (57) ABSTRACT

Techniques for communicating particular information from a user to a touch screen device by way of a touch event is provided. Sensors that are operatively coupled to a sensing device sense an input from the user which conveys particular information. This input is then converted by the sensing device into another signal called the sensing device signal which is then transmitted from the sensing device to the user's skin. Then a second set of sensors that are operatively coupled to a touch device receive a user-touch signal that is transmitted from the user's body. The user-touch signal is based, at least in part on the sensing device signal. The touch device then decodes the user-touch signal to determine the location of the touch event on the touch device and sensing device signal embedded in the user-touch signal to extract the particular information related to the user.

22 Claims, 5 Drawing Sheets

(56) References Cited

U.S. PATENT DOCUMENTS

| | | | |
|---|---|---|---|
| 2009/0085877 A1* | 4/2009 | Chang | G06F 3/0488 345/173 |
| 2010/0277435 A1 | 11/2010 | Han | |
| 2012/0242603 A1 | 9/2012 | Engelhardt et al. | |
| 2012/0278031 A1* | 11/2012 | Oda | G06F 3/0416 702/150 |
| 2013/0106725 A1 | 5/2013 | Bakken et al. | |
| 2013/0181953 A1 | 7/2013 | Hinckley | |
| 2015/0035643 A1 | 2/2015 | Kursen | |
| 2015/0138108 A1 | 5/2015 | Pope | |
| 2015/0220714 A1 | 8/2015 | Davis | |
| 2015/0363631 A1 | 12/2015 | Holz et al. | |
| 2016/0004898 A1 | 1/2016 | Holz et al. | |

OTHER PUBLICATIONS

Holz et al., "Fiberio: A Touchscreen that Senses Fingerprints", UIST, AMC, dated 2013, 10 pages.

U.S. Appl. No. 14/303,493, filed Jun. 12, 2014, Office Action, dated Aug. 13, 2015.
U.S. Appl. No. 14/303,493, filed Jun. 12, 2014, Notice of Allowance, dated Mar. 15, 2016.
U.S. Appl. No. 14/303,493, filed Jun. 12, 2014, Final Office Action, dated Oct. 20, 2015.
U.S. Appl. No. 14/303,493, filed Jun. 12, 2014, Advisory Action, dated Feb. 9, 2016.
Office Action dated Jun. 17, 2019 in U.S. Appl. No. 14/850,377.
Extended European Search Report dated Mar. 25, 2019 in European Application 16844832.2.
Office Action dated Sep. 5, 2019 in U.S. Appl. No. 14/850,377.
Office Action dated Jan. 28, 2020 in U.S. Appl. No. 14/850,377.
Notice of Allowance dated May 11, 2020 in U.S. Appl. No. 14/850,377.
Office Action dated Jul. 6, 2020 in Taiwanese Patent Application No. 105121884.
Office Action dated Sep. 25, 2020 in EP Application No. 16844832.2.
Notice of Allowance dated Aug. 13, 2020 in U.S. Appl. No. 14/850,377.

\* cited by examiner

USER IDENTIFICATION ON A PER TOUCH BASIS ON TOUCH SENSITIVE DEVICES

BENEFIT CLAIM

This application claims the benefit under 35 U.S.C. § 120 as a continuation of application Ser. No. 14/303,493, filed Jun. 12, 2014, the entire contents of which is hereby incorporated herein by reference for all purposes as if fully set forth herein. The applicant(s) hereby rescind any disclaimer of claim scope in the parent application(s) or the prosecution history thereof and advise the USPTO that the claims in this application may be broader than any claim in the parent applications.

FIELD OF THE INVENTION

The present disclosure relates to conveying particular user-related information to a touch sensitive device by way of a touch event.

BACKGROUND

Touch screen technology has revolutionized digital devices such as smartphones and tablets to become more and more capable of handling everyday computing. Currently, consumers are able to perform tasks such as email, web browsing, word processing, and internet banking through a touch screen device and without the need of a traditional computer.

Current touch screen devices send the two-dimensional coordinates of a touch event to the device's operating system. A touch event occurs when the touch screen senses the proximity of some conductive object, for example a finger, which is within certain distance of one or more node sensors attached to the touch screen. The finger's capacitance interferes with the capacitance measured at the node sensor. The node sensor picks up a change in the measured capacitance, which shows up as a salient spike in capacitance on that particular node sensor. Touch screen node sensors are designed to forward capacitance values to a touch screen controller. Touch screen controllers are configured to forward the two-dimensional coordinates of the touch event when the salient spike exceeds some predetermined threshold.

Specifically, once the predetermined threshold is exceeded, the touch screen controller interpolates the touch position of the touch event and then sends the two-dimensional coordinates (e.g. X, Y coordinates) to the operating system on the device. The operating system then maps the two-dimensional coordinates from the touch screen controller to the two-dimensional coordinate space of the operating system to figure out whether the touch event falls onto a displayed control in order to trigger some action.

Current touch screen technology requires a two-step process for authentication and user touch inputs. The first step being some user-authentication to unlock the device or authorize the action. The second step being the subsequent user touch inputs that perform the desired action on the device. For example, traditional means of accessing a secured device involve the input of a user-ID and password. This method of authentication assumes that after the user-ID and password have been successfully entered, the subsequent actions are performed by the authorized user. However, this is susceptible to unauthorized access because a hijacker could simply steal or acquire the user-ID and password and then enter the stolen user-ID and password to gain access to the device. The device will still assume that the person performing the subsequent actions is the authorized user. Alternatively, the hijacker could simply steal the device after the authorized user has entered the password.

Current methods of authentication to combat the stolen user-ID and password scenario include techniques such as fingerprint scanning. Where a fingerprint scanner is embedded into the device, such as the current iPhone™ home button, so that the user is required to unlock the device using his unique fingerprint before performing subsequent touch events. However, this technique is still an indirect means of authentication. Hijackers may not be able to steal your fingerprint but, they may be able to acquire the device after it has been authenticated by an authorized user. Once authenticated and unlocked, the device still assumes that the subsequent touch events are performed by an authorized user, not the hijacker.

Other techniques may use technologies such as, Bluetooth or near field communication, to continually authenticate that the user is within the immediate vicinity. However, this implements the same two-step approach to authentication where the communication point between the Bluetooth device and the touch device is susceptible to hijacking. Once hijacked, the touch device will still assume that the authorized user is performing subsequent touch events.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In order to overcome the vulnerabilities of the two-step method of authentication and subsequent user-touch inputs, techniques are provided in which authentication is performed within the touch event itself. Specifically, methods, non-transitory computer-readable media, and systems are provided for communicating particular information from a user to a touch screen device by way of a touch event.

According to one embodiment, a sensing device, separate from the touch screen device, detects input which conveys particular information. The nature of the input detected by the sensing device may vary from implementation to implementation, based on the type of sensors used by the sending device. In one embodiment, the particular information detected by the sensor includes biometric information that is unique to the user.

The input detected from the user is then converted by the sensing device into another signal that is then transmitted from the sensing device to the user's skin. Applying the signal to the user's skin causes the signal to be conveyed to the user's finger. When the user uses that finger to initiate a touch event on a target touch device while the signal is being applied to the user's skin, the sensors of the target touch device receive a user-touch signal from the user. The user-touch signal is based, at least in part, on the signal transmitted from the sensing device through the user's body. The touch device then decodes the touch signal to both (a) determine the location of the touch event on the touch device and (b) obtain the sensing device signal embedded in the user-touch signal to extract the particular information related to the user.

This method of directly transferring particular data that is unique to the user will eliminate the need of a two-step process of authentication and subsequent touch events. By embedding user specific data into the touch signal itself, the user is able to convey his identity along with the coordinates of the touch event.

Sensing User Specific Data

Figure 1:
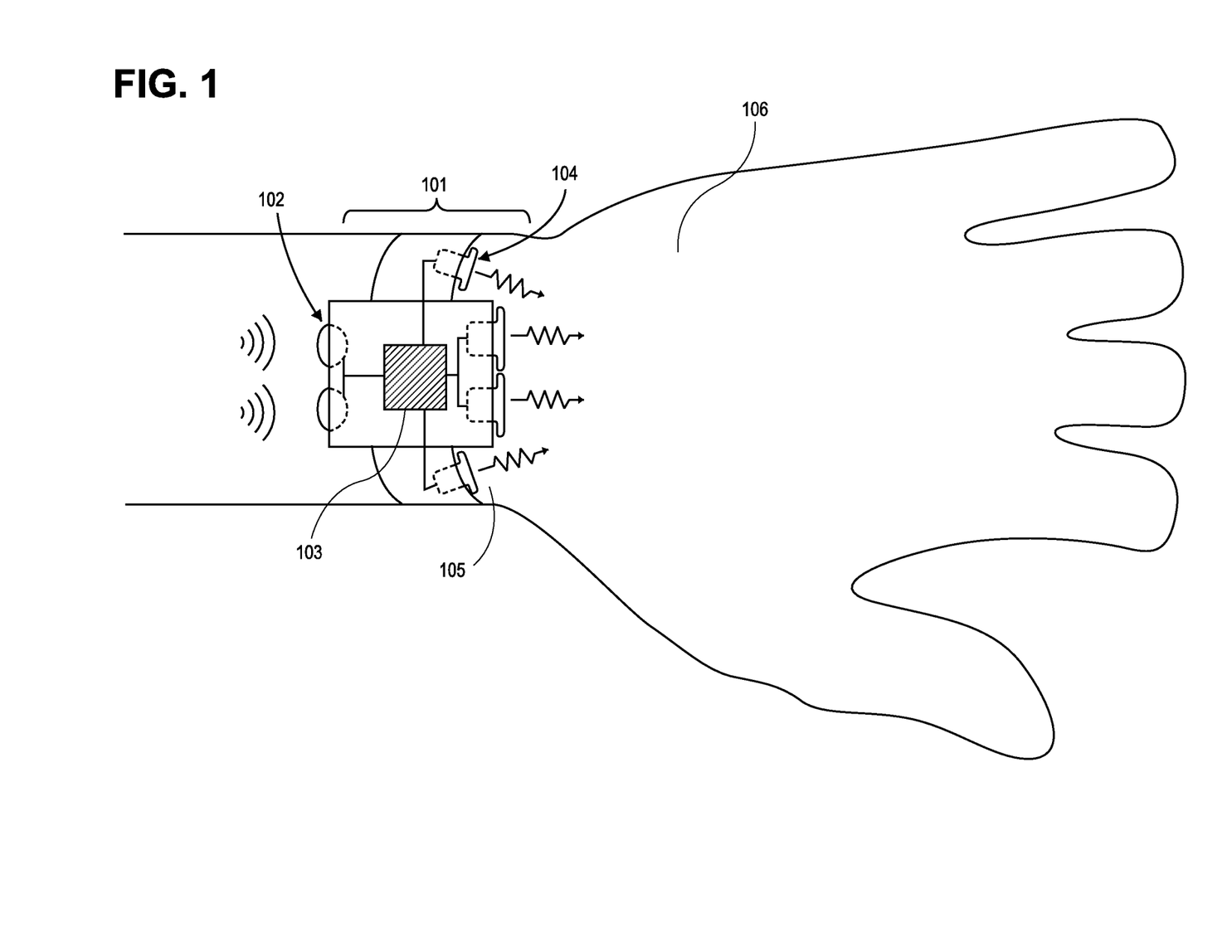
FIG. 1 illustrates a system diagram of the sensing device worn by the user.

FIG. 1 illustrates an embodiment of the sensing device 101 used to detect input from the user. The detected input may convey particular information related to the user including, but is not limited to, biometric information about the user. Biometric information is a measureable biological characteristic to identify an individual. Biometric information that is useful for determining a user's identity requires that the biometric information be easily measureable in all individuals, unique to each individual, and a permanent characteristic that does not change over time. Biometric information for determining a user's identification include, but are not limited to, electrocardiogram (ECG), retina scan, iris scan, DNA matching, and vein patterns of the finger or palm.

In one embodiment, the particular information detected by the sensing device 101 from the user is the user's ECG. An ECG is described as electric current generated when a user's heart beats. The generated electric current spreads not only through the heart, but also throughout the user's body. The waveforms for the electric current shape the overall ECG measured. The shape of the ECG also depends on the anatomical features of the user's heart and other parts of the body. Since anatomic features of the heart and other parts of the body are unique to each individual, the ECG is an excellent biometric characteristic for determining identity based upon its uniqueness.

The sensing device 101 uses sensing device sensors 102, which, are coupled to the sensing device 101, to detect the ECG from the user's skin. In FIG. 1, the sensing device sensors 102 are strategically placed on the sensing device 101 so that the sensing device sensors 102 come into contact with the user's skin 106, for instance at the user's wrist 105.

Once in contact with the user's skin 106, the sensing device sensors 102 detect the ECG emitted from the user's heart through the user's skin 106. In the current embodiment, the sensing device sensors 102 are continually detecting the biometric information.

In another embodiment, the sensing device sensors 102, which are coupled to the sensing device 101, may include a camera that scans the user's retina and/or iris for a uniquely identifiable biometric information. Other embodiments may also include sensing device sensors 102 that detect vein pattern recognition of a user's finger or palm.

In the various embodiments, including ones not listed above, the sensing device sensors 102 detect particular information related to the user, for the purpose of conveying the information to the processing unit 103.

Transmitting User Specific Data

The processing unit 103 is operatively coupled to the sensing device 101. In one embodiment the processing unit 103 is configured to receive the input detected by the sensing device sensors 102 and convert the input, for instance the biometric information from the user, into a signal called the device-to-user signal 305. A device-to-user signal 305 is a signal that contains the particular information detected from the user, which is capable of being transmitted to another device using the user's skin 106 as a transfer medium. Embodiments of the device-to-user signal 305 include, but are not limited to, a modulating alternating current (AC) at a high frequency. For example, the device-to-user signal 305 is the converted biometric information modulated onto an AC signal at a frequency of 2000 Hertz. Other embodiments of the device-to-user signal 305 may vary the frequency of the AC signal.

Other embodiments of the processing unit 103 may include, but are not limited to, receiving the detected biometric information sensed from the sensing device sensors 102, converting the biometric information into a digital bitstream, then adding additional information related to the user to the digital bitstream, and then converting the digital bitstream into the device-to-user signal 305. Embodiments of this additional information may include, personal data related to the user, location information related to the user, or personal preferences set by the user.

The processing unit 103 sends the device-to-user signal 305 to the transmitting unit 104 so that it can be transmitted to the user's skin 106. In one embodiment, the transmitting unit 104 transmits the device-to-user signal 305 in the form of modulated AC signal to the user's skin 106, at a voltage level low enough so that the user does not feel the AC signal transmitted and does not cause the user any adverse effects, such as involuntary muscle movement. The transmitting unit 104 is operatively coupled to the sensing device 101. The transmitting unit 104 is positioned on the sensing device 101 so that the transmitting unit 104 comes into direct contact with the user's skin 106. By having direct contact with the user's skin 106, the transmitting unit 104 is able to transmit the device-to-user signal 305 directly to the user's skin.

In one embodiment, the sensing device 101 is configured to continually detect the user input by the sensing device sensors 102, continually convert the detected input into a device-to-user signal 305 by the processing unit 103, and continually transmit the device-to-user signal 305 by the transmitting unit 104. In one embodiment, the sensing device 101 is configured not to store any data, so that when the user removes the sensing device 101 from his body, the sensing device 101 would cease to transmit particular information related to that user. This feature is advantageous as a security measure because it prevents an unauthorized user from stealing the sensing device 101 and using it to convey particular information, such as user-specific biometric information, used to authenticate the sensing device owner (the user).

Figure 2:
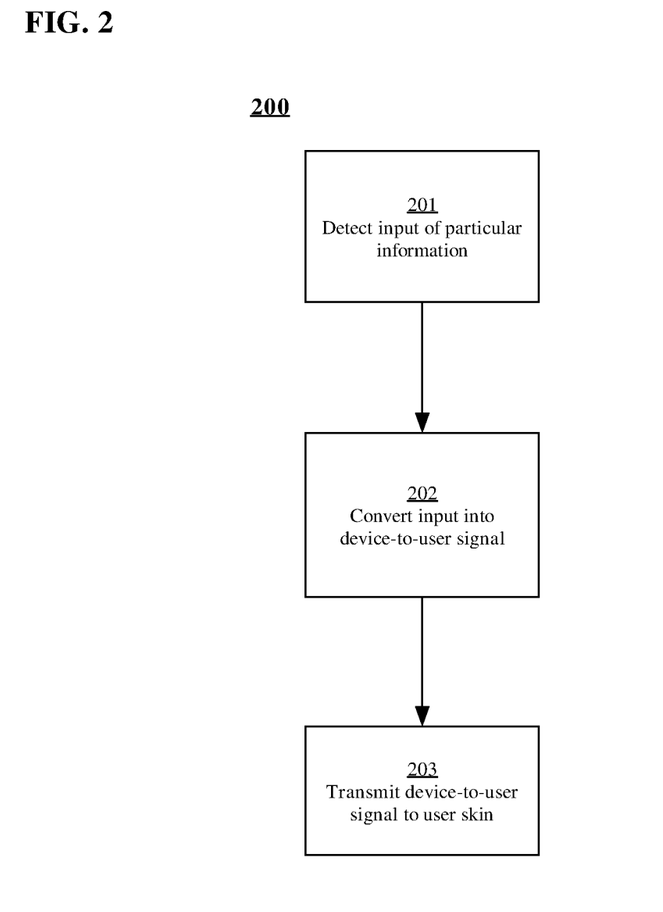
FIG. 2 illustrates a flow diagram of the method implemented by the sensing device.

FIG. 2 is a flow diagram that depicts a process 200 for detecting particular information from the user, transforming the particular information into a device-to-user signal 305, and transmitting the device-to-user signal 305 to the user's skin. At block 201, an input which conveys particular information, such as biometric data of the user, is detected using the sensing device sensors 102. At block 202, the input is converted to a device-to-user signal 305 by the processing unit 103. At block 203, the device-to-user signal 305 is transmitted from the sensing device 101 to the user's skin by the transmitting unit 104.

Once the transmitting unit 104 transmits the device-to-user signal 305 to the user skin, the device-to-user signal 305 travels through the user's body, using the user's skin 106 as a conduit, to its destination, a capacitive touch screen device 301.

The Sensing Device

The embodiments of the sensing unit 101 depicted in FIG. 1 may take the form of a wristband or watch-like device and may position the transmitting unit 104 on the inner band of the wristband so that direct contact with the user's skin is achieved.

Other embodiments of the sensing device 101 include, but are not limited to, clothing, eyewear, rings, necklaces, or any other wearable jewelry. The transmitting unit 104 would then be strategically placed so that it comes into direct contact with the user's skin. For example, if the sensing device 101 is a hat, then the transmitting unit 104 may be placed within the headband of the hat so that it comes into contact with the user's forehead. Yet other embodiments of the sensing device 101 may include, but are not limited to, a mobile device such as a phone or tablet where the sensing device sensors 102 and the transmitting unit 104 are both strategically positioned so that they come into contact with the user in order to detect the particular information and send the device-to-user signal 305 when the mobile device is held by the user.

The nature of the sensors used by sensing unit 101 will vary based on the type of information that is to be conveyed to the touch device. For example, when the information is the user's EKG, then the sensing unit will use a different type of sensor than when the information is the user's alcohol content, as measured by a Breathalyzer. The latter case may be useful, for example, to prevent operations initiated by user-touch events of intoxicated users.

Receiving the Signal by Touchscreen

Figure 3A:
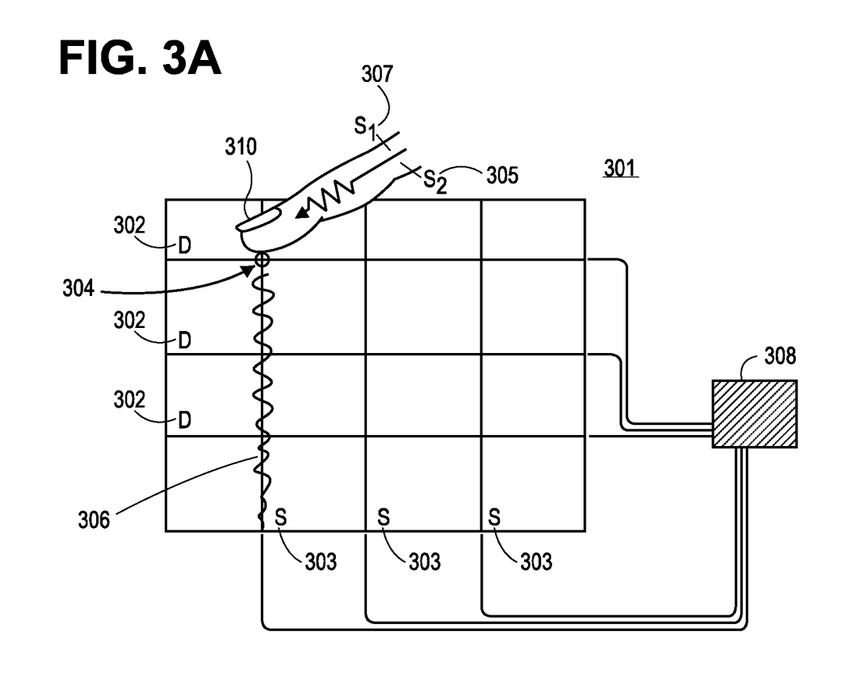
FIG. 3A illustrates a diagram of the touch device receiving a user-touch signal.

FIG. 3A is an illustration of the capacitive touch screen device 301 with sensors presently available in the market. The touch screen device 301 consists of drive lines 302 along one particular axis (X-axis), which are used to carry current across the particular axis, and sense lines 303 along the other axis (Y-axis), which are used to detect the voltage at each particular sensor node, such as the target node 304. The capacitance across a particular sensor node is calculated as the current divided by the rate of change in voltage across that sensor node. When no external object is in close proximity with the sensor node, the value of capacitance gives a relative baseline for the level of capacitance when no touch event occurs.

The user sends a user-touch signal 307 to the capacitive touch device 301 when he places a conductive object, such as his finger, in close proximity to the sensor nodes on the capacitive touch device 301. This close proximity causes the conductive object, such as his finger, to interfere with the capacitive field across the target node 304. The target node 304 reads the rate of change in the voltage to determine capacitance. When the rate of change in the voltage decreases, the target node 304 interprets this decreased rate of change in voltage as a spike in capacitance 315. All of the sensor nodes, including the target node 304 report their capacitance data to a sensor controller 308. The sensor controller 308 then determines whether the spike in capacitance 315 at a particular node qualifies as a touch event.

Figure 3B:
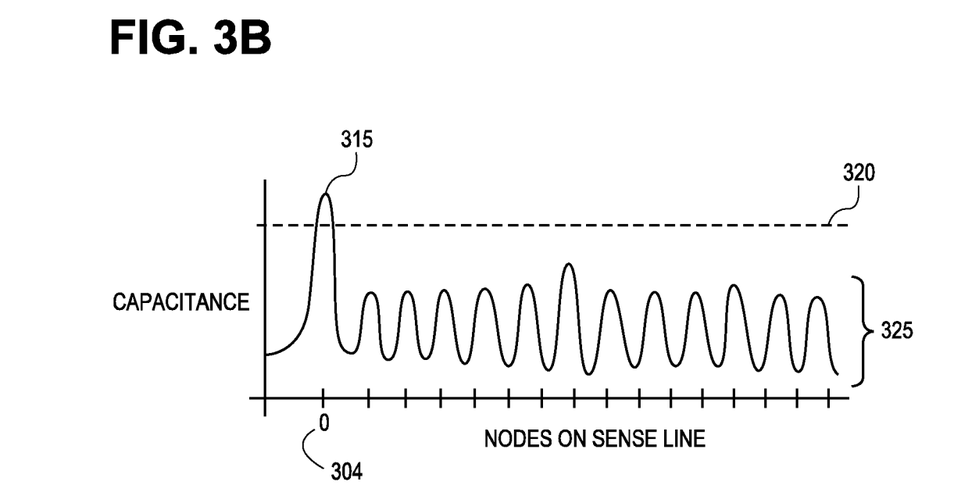
FIG. 3B illustrates a graph depicting the measured capacitance of each node on a particular sense line.

FIG. 3B illustrates that the spike in capacitance 315 from the user-touch signal 307 exceeds the set threshold 320 for a touch event. The set threshold 320 of capacitance is set by the manufacturer in order to ensure that only real touch events by the user are interpreted as touch events and slight changes in capacitance due to outside factors creating noise are not interpreted as touch events. Once the sensor controller 308 identifies a touch event, the sensor controller 308 interpolates the 2D coordinates of the touch event.

The device-to-user signal 305 is applied to the user's skin using transmitting unit 104; when the user sends a user-touch signal 307 to the touch screen device 301, the device-to-user signal 305 is sent as part of the user-touch signal 307. This occurs because the device-to-user signal 305, consisting of a modulated AC signal, is transferred to the capacitive field during the sending of user-touch signal 307. When the user sends a user-touch signal 307 to the target node 304, the modulated AC signal acts as a new drive line sending current down the target sense line 306 of the target node 304. The effect of the device-to-user signal 305 to the target sense line 306 is illustrated in FIG. 3B.

FIG. 3B shows the measured capacitance on the target sense line 306 where the X-axis consists of the measured nodes on the target sense line 306 and the Y-axis depicts the measured capacitive values at each of those measured nodes. The FIG. 3B graph shows spike in capacitance 315 at target node 304 where the user's finger 310 touches the touch screen, which is caused by the change in capacitance from conductive nature of the user's finger 310. The measured capacitance on the other nodes along the target sense line 306 show a rise in capacitance as well. These are the device-to-user spikes in the capacitance 325. The device-to-user spikes in the capacitance 325 are based on the modulated AC signal from the device-to-user signal 305. This occurs because when the new AC current from the device-to-user signal 305 is introduced to the target sense line 306, the voltage input on the target sense line 306 has increased from the original voltage input given by the drive lines 302, even though the capacitance has not. The capacitance is measured by determining the rate of voltage discharge over a period of time where the input voltage and current are known. In this case, there is more input voltage than normal. Therefore the rate of discharge seems less and the node sensors interpret this change to a higher than normal measured capacitance, even though the capacitance has not changed.

In FIG. 3B, the device-to-user spikes in the capacitance 325 are low enough so as to not exceed the set threshold 320 and do not cause a false touch event. The level of voltage emitted by the device-to-user signal 305 is sufficient enough to clearly differentiate between the measured capacitance with the device-to-user signal 305 applied and the measured capacitance without the device-to-user signal 305 applied. Since the device-to-user signal 305 is a modulated AC signal which, modulates over a specified frequency, the sensor controller 308 is then able to interpret from the node sensor capacitance data whether or not, in a specific moment in time, the device-to-user spikes in capacitance 325 exist. By decoding the existence of the device-to-user spikes in capacitance 325 as a binary value of 1 and the non-existence of the device-to-user spikes in capacitance 325 as a binary value of 0 over a set period of time, the sensor controller 308 is able to compile a binary sequence from the device-to-user signals over the set period of time.

In one embodiment, the set period of time to compile the binary sequence is the period between when the touch event begins and when the touch event ends. During this set period of time the node sensors on the target sense line 306 relay the node sensor capacitance data to the sensor controller 308 which then decodes the capacitance data into a binary sequence. This decoded binary sequence represents the originally detected input by the sensing device 101 which was then converted into the device-to-user signal 305 and then transmitted through the user's skin 106 to the capacitive touch device 301 through the user-touch signal 307.

Other embodiments include, but are not limited to, encoding multiple signals in the device-to-user signal 305 based on different frequencies. The sensor controller 308 can be programmed to decode the device-to-user spikes in capacitance 325 and multiple frequencies in order to compile multiple sets of binary sequences during the touch event time interval.

In another embodiment, the touch screen device 301 is able to differentiate between simultaneous user-touch signals, including separate and distinct user-touch signals and separate and distinct device-to-user signals. The sensor controller 308 is then able to decode the separate and distinct device-to-user signals into separate binary sequences. Then the sensor controller 308 is able to associate those separate binary sequences to their corresponding interpolated 2D coordinates from the separate and distinct touch events identified.

Once the sensor controller 308 decodes the binary sequence, the sensor controller 308 sends: the interpolated 2D coordinates of the touch event associated with the user-touch signal 307, and the decoded binary sequence to the operating system. In one embodiment, the operating system may map the interpolated 2D coordinates of the touch event to the 2D coordinate space of the operating system to determine whether or not a button was pressed. Then the operating system may use the decoded binary sequence from the user to determine whether or not the user is authorized to perform the action associated with the corresponding pressed button.

Figure 4:
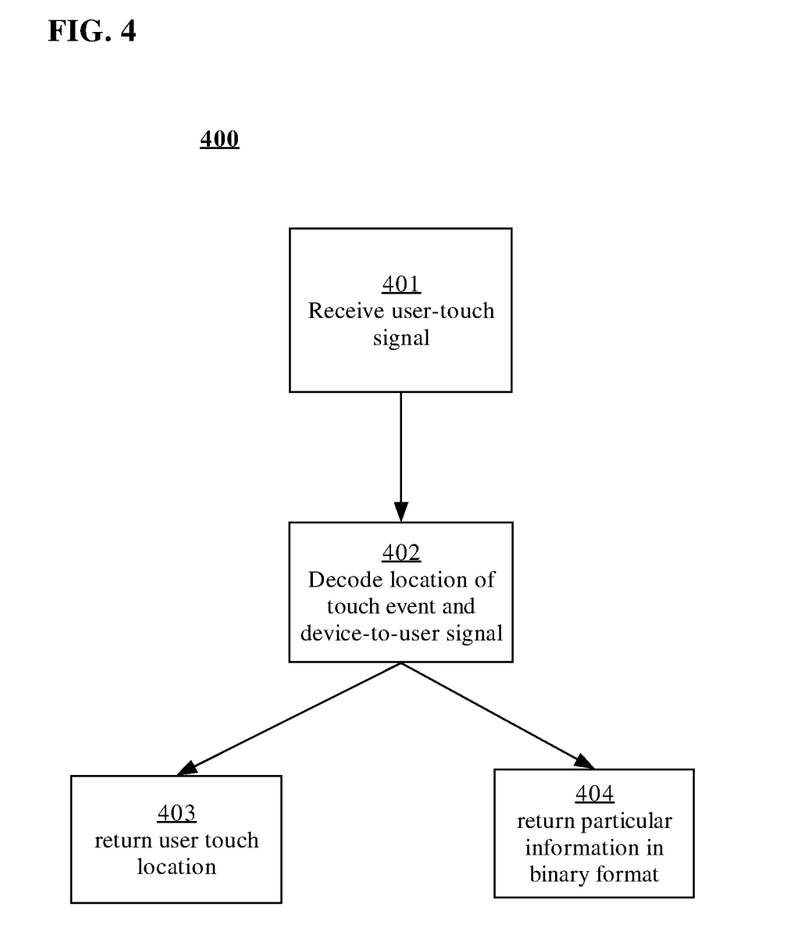
FIG. 4 illustrates a flow diagram of the method implemented by the touch device to receive and decode a user-touch signal.

FIG. 4 is a flow diagram that depicts a process 400 for receiving a user-touch signal 307, decoding the user-touch signal 307 to extract the touch event and determining the 2D coordinates associated with that touch event, and decoding the device-to-user signal 305 within the user-touch signal 307 to determine the binary sequence representing the particular information from the user. In step 401, the touch screen device 301 receives a user-touch signal 307 from the user. The user-touch signal 307 may trigger a touch event at the particular target node 304 and include the device-to-user signal 305. At step 402 the user-touch signal 307 is then decoded by the sensor controller 308. The decoding step 402 includes determining the 2D coordinates of the user-touch signal 307 on the user touch device 301 where the spike in capacitance 315 exceeds the set threshold 320 to qualify as a touch event. Output 403 represents the touch event and its interpolated 2D coordinates. Step 402 also decodes from the user-touch signal 307 the device-to-user signal 305 to determine the binary sequence that represents the particular information from the user. Output 404 represents the particular information conveyed from the user in a binary format.

Concurrent Initiation and Authentication

Using the techniques described herein, the same input that specifies an operation is used to determine whether the operation being performed by an authorized user. For example, assume that user X is authorized to perform operations A and B, user Y is authorized to perform operation C, and user Z is not authorized to perform any operation. In response to detecting a touch event, the touch screen device determines what operation the touch event is configured to initiate (touch events initiate different operations based on the location of the touch events and the context in which the touch events occur). In addition to determining the operation, the touch device determines the identity of the user by mapping the biometric information conveyed in the touch signal to a user-id. That user-id is then checked against the list of user-ids that are authorized to perform that operation. If the user-id that corresponds to the biometric information matches a user-id that is authorized to perform the operation, then the operation is executed. For example, if the touch event initiates operation C, and the biometric information is that of user Y, then operation C is executed. On the other hand, if the biometric information does not match an authorized user for that operation, the operation is not performed. Instead, an error message may be generated. For example, if operation C attempted through a touch event by user X, then rather than perform operation C, the touch screen device may generate an error message.

Because the user-touch signal serves the dual purpose of specifying an operation and identifying the user that is attempting to perform the operation, users that are authorized to perform different actions may simply pass the touch screen device between them without having one user log out to let another user log on. For example, user X can perform operation A (which user Y is not authorized to perform), and then pass the device to user Y. Without any logging in or out, user Y may then perform operation C (which user X is not authorized to perform). In sharing the touch screen device with user Y, user X need not fear that user Y would perform operation A, because any attempt to do so by user Y would be denied.

Concurrent Users

The techniques described herein may be used to detect which user-touch events, concurrently input on the same touch screen device, were performed by which users. For example, in a game environment, both user X and user Y may be concurrently performing touch events on the same touch screen. For each user-touch event, the touch screen device may determine the user that performed the user-touch event by the biometric information that is decoded from the user-touch signal. Depending on who performed which touches, the game (or any other software) may perform differently.

User-Specific Operations

Rather than merely determine whether an operation is authorized, the biometric information conveyed in the user-touch signal may affect how a requested operation is carried out. For example, if a touch-event initiates a "read email" operation, the email messages that are displayed to the user may be based on the biometric information conveyed by the user-touch signal that triggered the touch event. For example, if the biometric information matches user X, then the touch event causes the display of email messages from user X's inbox. On the other hand, if the biometric information matches user Y, then the touch event causes the display of email messages from user Y's inbox.

As another example, a user may use a touch screen to select a control to purchase an item. The user-touch signal may be decoded to determine the identity of the user that selected that button. If that user is registered and has sufficient funds available, then the purchase may execute immediately. If the user is registered but does not have sufficient funds, then the user may be presented with prompts to indicate a means for paying. If the user is not registered, or not identified at all, then the user may be presented with prompts to create an account.

Operating System-Based Authorization

According to one embodiment, the techniques described herein may be used in a manner that involves the operating system in the authentication process. For example, rather than simply convey that a touch event occurred at a particular location on a touch screen, the operating system may convey to an application the event type, the screen location, and the identity of the user that performed the event. Based on this additional information, applications may perform authentication and/or initiate user-specific operations.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
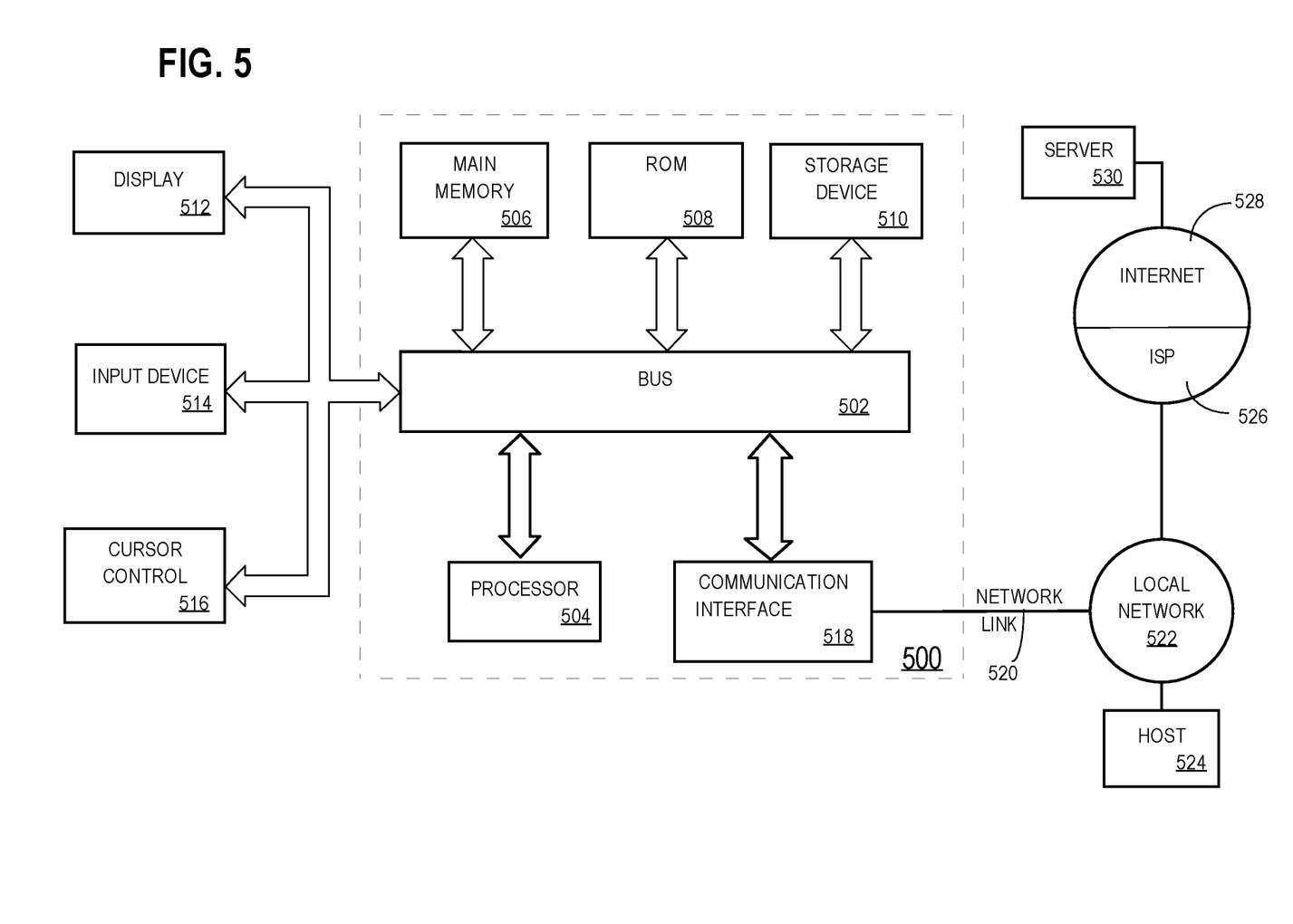
FIG. 5 illustrates an example computer system that may be specially configured to perform various techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Benefits of Certain Embodiments

In an embodiment, a solution as described herein improves security on a device which uses a touch screen for input. Current touch screen devices usually employ security measures to either unlock the device or to perform a specific action that requires authentication. User-touch inputs are not authenticated directly. By incorporating the authentication step into the user-touch input itself, it eliminates the vulnerability of unauthorized user-touch signals after a device has been unlocked or a user has been authenticated. Furthermore, this solution enhances the level of security for each user-touch input because each user-touch input is now authenticated against a set list of authorized users.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    receiving, by a plurality of touch-device sensors operatively coupled to a touch surface on a touch device, a first user-touch signal transmitted from a first user's body while a first device-to-user signal is being applied to the first user's body, wherein the first user-touch signal includes the first device-to-user signal that conveys first particular information including biometric information of the first user and personalized data associated with the first user such that the first user-touch signal specifies:
        a particular operation determined based on a second particular information included in the first device-to-user signal associated with the first user, the second particular information being different than the first particular information, and
        an identification of the first user embedded in the first user-touch signal;
    determining, by a sensor controller, that a first touch event occurred at a first location on the touch device based on an attribute at a touch-device sensor corresponding to the first location being greater than a threshold, and wherein attributes at one or more other touch-device sensors are lower than the threshold, wherein the attributes reflect that the first user-touch signal is transmitted from the first user's body while the first device-to-user signal is being applied to the first user's body;
    based on the first user-touch signal received, determining, by the sensor controller, the first particular information;
    determining the particular operation to be performed at the first location in response to the first touch event, wherein the particular operation is personalized with respect to the first user in accordance with the biometric information and the personalized data in the first particular information; and
    performing the particular operation in a manner consistent with the personalized data.

2. The method of claim 1, wherein determining the particular operation further includes determining one or more parameter values based on the first particular information.

3. The method of claim 2, wherein selecting the action includes:
    selecting a first action based on the first location; and
    based on the first particular information, determining that a second action different from the first should be performed instead of the first action; and
    wherein performing the particular operation includes performing the second action and not the first action.

4. The method of claim 1, wherein:
    performing the particular operation includes generating a first particular output display on the touch device; and
    the first particular output display is based, at least in part, on the first particular information.

5. The method of claim 1, further comprising:
    concurrent to receiving the first user-touch signal, receiving a second user-touch signal by the plurality of touch-device sensors operatively coupled to the touch surface on the touch device;
wherein the second user-touch signal is transmitted from a second user's body while a second device-to-user signal is being applied to the second user's body;
wherein the second user-touch signal is based, at least in part, on the second device-to-user signal that conveys a third particular information;
determining, by the sensor controller, that a second touch event occurred, concurrent to the first touch event, at a second location on the touch device;
wherein determining that the second touch event occurred includes determining x, y, coordinate values of the second location of the second touch event; and
determining, by the sensor controller, the third particular information from the second user-touch signal.

6. The method of claim 5, wherein determining the particular operation includes:
selecting an action based on the first location and the second location; and
determining one or more parameter values of the action based on the first particular information and the third particular information.

7. The method of claim 5, wherein determining the particular operation includes:
selecting a first action based on the first location and the first particular information; and
selecting a second action based on the second location and the third particular information; and
wherein performing the particular operation includes performing the first action and the second action.

8. The method of claim 7, wherein:
the first action is a first type of action; and
the second action is the first type of action.

9. The method of claim 7, wherein:
the first action is a first type of action; and
the second action is a second type of action that is different than the first type of action.

10. The method of claim 1, wherein the first user-touch signal comprises a plurality of peaks at most one of which satisfies a criterion such that none of the other peaks causes a false touch event.

11. The method of claim 1, wherein each of the plurality of touch-device sensors is located on the touch surface at a distinct combination of x, y coordinate values,
wherein the sensor controller is operatively coupled to the plurality of touch-device sensors, and
wherein determining that the first touch event occurred includes determining x, y coordinate values of the first location of the first touch event.

12. The method of claim 1, further comprising:
selecting an action based on the first location; and
determining that the action is authorized based on the first particular information,
wherein the personalized data comprises personal data of the user, location information of the user, or personal preferences of the user.

13. The method of claim 1, wherein the attribute corresponds to a rate of change in voltage.

14. A method, comprising:
using a set of one or more sensing-device sensors operatively coupled to a first sensing device to sense first input;
converting, by the first sensing device, the first input into a first device-to-user signal; and
applying the first device-to-user signal from the first sensing device to a first user's body;

receiving, by a plurality of touch-device sensors operatively coupled to a touch surface on a touch device, a first user-touch signal transmitted from the first user's body while the first device-to-user signal is being applied to the first user's body, wherein the first user-touch signal includes the first device-to-user signal that conveys first particular information, the first particular information including biometric information of the first user and personalized data associated with the first user such that the first user-touch signal specifies a particular operation determined based on a second particular information included in the first device-to-user signal associated with the first user, and an identification of the first user embedded in the first user-touch signal, the second particular information being different than the first particular information;
determining, by a sensor controller, that a first touch event occurred at a first location on the touch device based on an attribute at a touch-device sensor corresponding to the first location being greater than a threshold, and wherein attributes at one or more other touch-device sensors are lower than the threshold, wherein the attributes reflect that the first user-touch signal is transmitted from the first user's body while the first device-to-user signal is being applied to the first user's body;
based on the first user-touch signal received, determining, by the sensor controller, the first particular information;
determining the particular operation to be performed at the first location in response to the first touch event, wherein the particular operation is personalized with respect to the first user in accordance with the biometric information and the personalized data in the first particular information; and
performing the particular operation in a manner consistent with the personalized data.

15. The method of claim 14, wherein using the set of one or more sensing-device sensors to sense the first input includes using the set of one or more sensing-device sensors to sense biometric information of the first user.

16. A non-transitory computer-readable medium that stores instructions which, when executed by one or more processors, cause performance of:
receiving, by a plurality of touch-device sensors operatively coupled to a touch surface on a touch device, a first user-touch signal transmitted from the first user's body while the first device-to-user signal is being applied to the first user's body, wherein the first user-touch signal is based on the first device-to-user signal that conveys first particular information, the first particular information including biometric information of the first user and personalized data associated with the first user such that the first user-touch signal specifies a particular operation determined based on a second particular information included in the first device-to-user signal associated with the first user, and an identification of the first user embedded in the first user-touch signal, the second particular information being different than the first particular information;
determining, by a sensor controller, that a first touch event occurred at a first location on the touch device based on an attribute at a touch-device sensor corresponding to the first location being greater than a threshold, and wherein attributes at one or more other touch-device sensors are lower than the threshold, wherein the attributes reflect that the first user-touch signal is transmitted from the first user's body while the first device-to-user signal is being applied to the first user's body;

based on the first user-touch signal received, determining, by the sensor controller, the first particular information;

determining the particular operation to be performed at the first location in response to the first touch event, wherein the particular operation is personalized with respect to the first user in accordance with the biometric information and the personalized data in the first particular information; and performing the particular operation in a manner consistent with the personalized data.

17. The non-transitory computer-readable medium of claim 16, wherein determining the particular operation further includes determining one or more parameter values based on the first particular information.

18. The non-transitory computer-readable medium of claim 16, wherein the one or more processors further cause:
selecting an action based on the first location; and
determining that the action is authorized based on the first particular information, wherein selecting the action includes:
selecting a first action based on the first location; and
based on the first particular information, determining that a second action different from the first should be performed instead of the first action; and
wherein performing the particular operation includes performing the second action and not the first action.

19. The non-transitory computer-readable medium of claim 16, wherein:
performing the particular operation includes generating a first particular output display on the touch device; and
the first particular output display is based, at least in part, on the first particular information.

20. The non-transitory computer-readable medium of claim 16, further comprising instructions which, when executed by one or more processors, cause performance of:
concurrent to receiving the first user-touch signal, receiving a second user-touch signal by the plurality of touch-device sensors operatively coupled to the touch surface on the touch device;
wherein the second user-touch signal is transmitted from a second user's body while a second device-to-user signal is being applied to the second user's body;
wherein the second user-touch signal is based, at least in part, on the second device-to-user signal that conveys a third particular information;
determining, by the sensor controller, that a second touch event occurred, concurrent to the first touch event, at a second location on the touch device;
wherein determining that the second touch event occurred includes determining x, y, coordinate values of the second location of the second touch event; and
determining, by the sensor controller, the third particular information from the second user-touch signal.

21. The non-transitory computer-readable medium of claim 20, wherein determining the particular operation includes:
selecting an action based on the first location and the second location; and
determining one or more parameter values of the action based on the first particular information and the third particular information.

22. The non-transitory computer-readable medium of claim 20, wherein determining the particular operation includes:
selecting a first action based on the first location and the first particular information; and
selecting a second action based on the second location and the third particular information; and
wherein performing the particular operation includes performing the first action and the second action.

* * * * *